United States Patent [19]

Godfrey

[11] Patent Number: 5,256,016

[45] Date of Patent: Oct. 26, 1993

[54] SWEDGE ANCHORING ASSEMBLY

[76] Inventor: Dwaine A. Godfrey, 10 Beechcrest La., Cincinnati, Ohio 45206

[21] Appl. No.: 790,255

[22] Filed: Nov. 8, 1991

[51] Int. Cl.$^5$ ............................................ F16B 13/04
[52] U.S. Cl. ......................................... 411/32; 411/44; 411/55; 411/60
[58] Field of Search ........................ 411/32, 44, 54, 55, 411/57, 60

[56] References Cited

U.S. PATENT DOCUMENTS

| | | |
|---|---|---|
| 445,332 | 1/1891 | Phillips . |
| 626,040 | 5/1899 | Rowlands . |
| 784,845 | 3/1905 | Evans . |
| 1,031,462 | 7/1912 | Paine . |
| 3,063,329 | 11/1962 | Vaughn ............... 411/55 X |
| 3,797,755 | 3/1974 | Saisho ................ 411/60 X |
| 3,874,264 | 4/1975 | Polos ..................... 411/57 |
| 4,293,259 | 10/1981 | Liebig . |
| 4,331,413 | 5/1982 | Hoehn ..................... 411/44 |
| 4,339,217 | 7/1982 | Lacey . |
| 4,690,597 | 9/1987 | Liebig . |
| 4,702,656 | 10/1987 | Kerrom . |
| 4,714,391 | 12/1987 | Bergner . |
| 4,832,547 | 5/1989 | Shiraishi ............... 411/60 X |

FOREIGN PATENT DOCUMENTS

| | | |
|---|---|---|
| 2114036 | 10/1972 | Fed. Rep. of Germany . |
| 2505402 | 8/1976 | Fed. Rep. of Germany ........ 411/54 |
| 2552552 | 6/1977 | Fed. Rep. of Germany . |
| 2632487 | 1/1978 | Fed. Rep. of Germany . |
| 2909749 | 9/1980 | Fed. Rep. of Germany . |
| 3105038 | 9/1982 | Fed. Rep. of Germany . |
| 13144 | 4/1973 | Japan ..................... 411/60 |
| 48678 | 11/1930 | Norway . |
| 107822 | 11/1924 | Switzerland ............ 411/55 |
| 739266 | 6/1980 | U.S.S.R. ............... 411/44 |
| 2058266 | 4/1981 | United Kingdom ......... 411/44 |

Primary Examiner—Peter M. Cuomo
Assistant Examiner—Suzanne L. Dino
Attorney, Agent, or Firm—Wood, Herron & Evans

[57] ABSTRACT

An anchoring assembly for use in a hole bored inwardly from the surface of a receiving material. The anchoring assembly includes, in general, an anchoring component or swedge anchor having a plurality of fingers, a spreading component or spreader having a tapered portion which points toward the anchoring fingers, a bolt or threaded shaft onto which the spreader and swedge anchor are positioned, and structure for interlocking the anchor and spreader together during the procedure for setting the assembly into a receiving material.

20 Claims, 2 Drawing Sheets

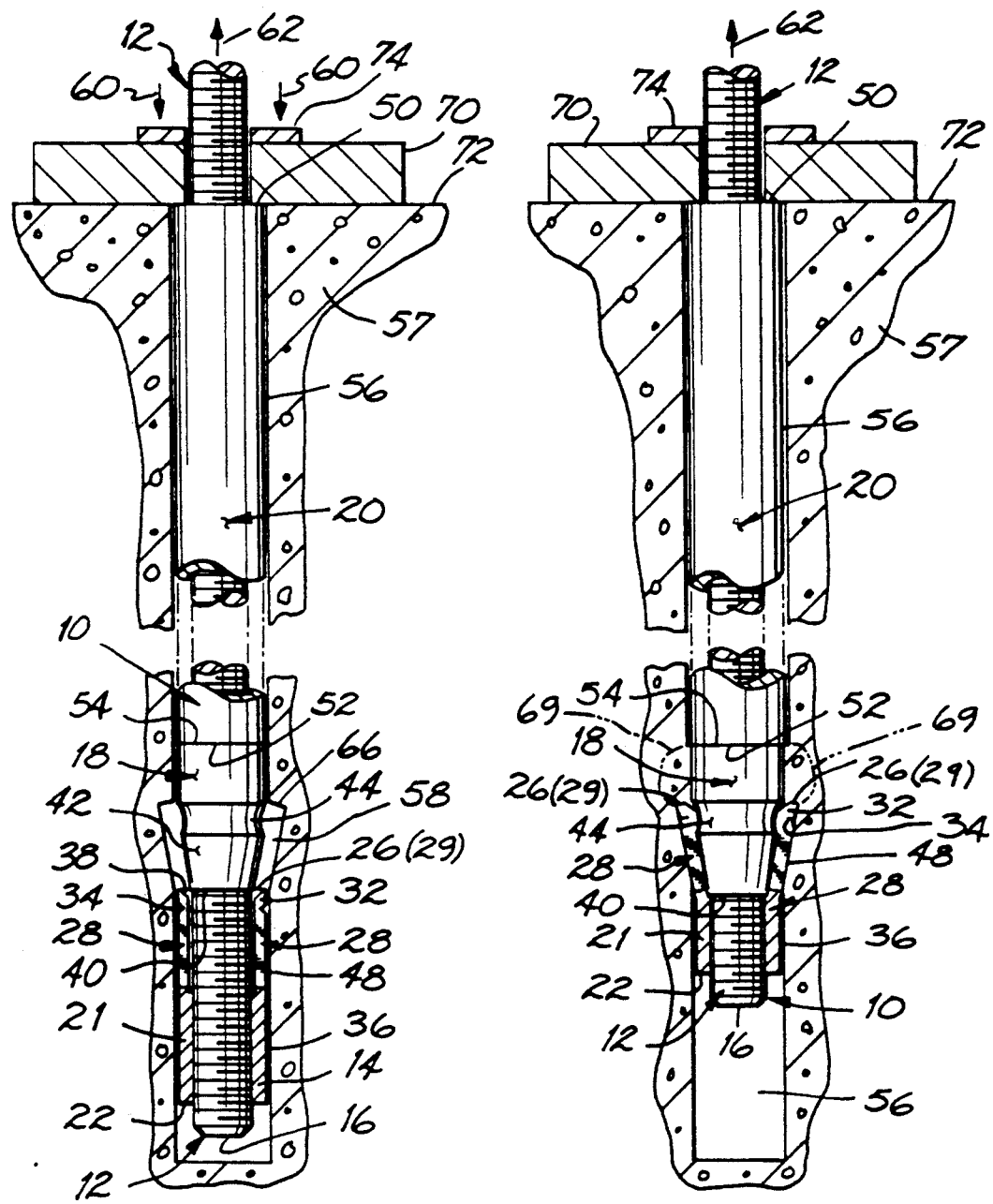

SWEDGE ANCHORING ASSEMBLY

FIELD OF THE INVENTION

This invention relates to an anchoring assembly for use in a hole bored inwardly from the surface of a receiving material. This invention may be used with a variety of receiving materials, such as concrete, brick, stone and the like. Concrete is discussed in this application as the receiving material for the purpose of example.

BACKGROUND OF THE INVENTION

It is often necessary to secure a workpiece or other object to the surface of structures built with concrete and similar materials. This has typically been accomplished by drilling a hole in the concrete, inserting some type of anchoring assembly, setting the anchoring mechanism within the hole (i.e., securing the assembly to the concrete) and securing the workpiece to the anchor assembly. The anchoring mechanism of many such anchor assemblies generally comprises a spreading and anchoring component. In setting, a tapered portion of the spreading component is forced against a portion of the anchoring component, typically having a finger-like structure. The taper causes the fingers to expand or spread either into an undercut cavity formed in the hole below the surface of the receiving material or against the inner walls of the hole itself. A setting sleeve is also typically used to facilitate engagement of these two components by transmitting at least part of the setting force.

A variety of anchoring assemblies of this general type have been devised, but two basic designs seem to be prevalent. With one type of anchoring assembly, the spreading component is secured to the leading end of a bolt or threaded shaft, with the tapered portion pointing back toward the trailing end of the shaft. The anchoring component is located next in line on the shaft, with expandable fingers pointing toward the leading end of the shaft and the tapered portion of the spreading component. During setting, the anchoring fingers expand or spread open toward the bottom of the hole. With the other type of anchoring assembly, the location on the shaft of the spreading and anchoring components are reversed, with the anchoring fingers pointing back toward the trailing end of the shaft. With either design, the setting sleeve is located on the shaft after the spreading and anchoring components. With some of the anchoring assemblies which use the former configuration, this sleeve is an integral part of the anchoring component. With some of the assemblies which use the latter configuration, it is an integral part of the spreading component.

When an anchoring mechanism of either configuration is initially set in a bare pilot hole (i.e., no undercut), spreading of the fingers generates lateral or transverse forces against the walls of the hole. Undercuts in the bored holes have been used, with both configurations, in an effort to reduce these initial lateral forces. The undercuts are typically conical shaped and provide an open area for the anchoring fingers to expand into. However, anchoring assemblies with the former configuration (i.e., fingers pointing toward the leading end of the shaft) still produce very high lateral forces when a subsequent axial load is applied to the assembly (i.e., tensile force applied to the threaded shaft). Depending on the angle of the conical undercut and the tapered portion of the spreading component, these forces can be as high as five times the axial load. These lateral forces can cause lateral bursting of the concrete if the assembly is anchored (i.e., the hole drilled) to close to a side surface of the concrete. In contrast, when a load is applied to an assembly which has the latter configuration (i.e., fingers pointing toward the trailing end of the shaft), most of the forces generated are exerted lengthwise or longitudinally between the ends of the anchoring fingers and the entrance to the hole. Therefore, the likelihood of lateral bursting is much lower (i.e., the hole can be bored closer to a side surface) with the latter configuration.

Despite the lower lateral forces exerted by the latter configuration, there appears to be more widespread acceptance of the former configuration in the construction industry in general, and the nuclear construction industry in particular. Even though the former configuration generates much greater lateral forces, when remotely located from side surfaces, such assemblies have been found to resist axial loading better than previously available assemblies having the latter configuration. In general, a high resistance to axial loading is important in the construction industry. However, it is also desirable, and mandatory in the nuclear construction industry, for the assembly to deform (i.e., absorb energy) under overload conditions rather than fail catastrophically (i.e., brittlely) and to fail before the concrete receiving material fails. In fact, the nuclear construction industry requires the threaded shaft to fail before the anchoring mechanism or the concrete.

There are times when it would be desirable to remove and replace the threaded shafts and leave the anchoring mechanism in place (e.g., when threads are damaged, the bolt is broken, etc.). This versatility would also permit the anchoring mechanism to be set to 100% of the ultimate strength of the threaded shaft by first tensioning the anchoring mechanism with a higher rated (i.e., stronger) shaft and then replacing that shaft with one having the appropriate characteristics (i.e., strength, corrosion resistance, etc.) for the particular application. With previously available anchoring assemblies, there is a significant risk of disengaging the anchoring and spreading components during removal of the shaft. This could require the assembly to be reset or even prevent resetting (e.g., if one of the components fell to the bottom of the hole). In addition, in some anchoring assemblies, the shafts cannot be separately removed at all. If the same threaded shaft is used for setting the anchoring mechanism and securing the workpiece, then the applied force used for setting must be below the threaded shaft's yield strength or risk damaging the shaft itself. Thus, it could not be guaranteed that the shaft would fail before the anchoring mechanism or the receiving material.

When a hole is drilled or bored, it is not always possible to guarantee the hole's depth. If the hole is drilled deeper than the depth at which the anchoring mechanism is to be located, a number of anchoring assemblies could not be used, notably the assembly disclosed in Liebig, U.S. Pat. No. 4,690,597. In Liebig, the anchoring mechanism is set by seating the anchoring component at the bottom of the hole, with its fingers pointing toward the entrance of the hole, and driving the tapered portion of the spreading component down toward the anchoring component, spreading the fingers. Thus, with such anchoring assemblies the depth of the hole must correspond with the proposed location of the anchoring mechanism.

SUMMARY OF THE INVENTION

It is an object of the present invention to provide an anchoring assembly, for use in a pilot hole bored inwardly from the surface of a receiving material, with superior anchoring characteristics. Such characteristics include the ability of the anchoring assembly (i.e., the threaded shaft and anchoring mechanism) to absorb energy under overload situations rather than fail catastrophically (i.e., it stretches and deforms rather than fractures without significant deformation), and preferably the threaded shaft fails before the anchoring mechanism (i.e., spreading and anchoring components), with the receiving material not failing at all. Such ductile failures are preferable over brittle failures because the deformation of the assembly provides a warning before failure actually occurs. In addition, failure of the anchoring assembly, and in particular the threaded shaft, is much easier to rectify than failure of the receiving material itself (i.e., replacement of a component or the assembly versus attempting to restore the structural integrity of the receiving material). Another characteristic is the generation of low lateral forces when an axial load is applied while maintaining superior axial strength. Thus, axial strength can be attained without increasing the risk of lateral bursting (i.e., failure of the receiving material).

Another object of the present invention is to provide such an assembly with an anchoring mechanism which is more likely to remain steadfast within the hole (i.e., less likely to loosen up) when subjected to cyclic or vibrational loading. A more particular object is to provide such an assembly with a spreading and anchoring component which interlock when the assembly is set and remain interlocked under operational conditions. This interlocking allows easy removal and replacement of the threaded shaft without a risk of the spreading and anchoring components disengaging. Thus a damaged or broken shaft can be replaced without having to reset the anchoring mechanism. In addition, one threaded shaft can be used for setting the anchoring mechanism and another shaft used under actual operating conditions. This versatility would allow the anchoring mechanism to be pretested or tensioned with a stronger shaft to 100% of the ultimate strength of the actual shaft used to secure the workpiece, without the securing shaft being damaged, thereby guaranteeing that in an overload situation the securing shaft would fail before the anchoring mechanism or the receiving material.

A further object is to provide such an assembly which will increase its bearing resistance as the applied load increases. A more particular object is to provide an anchoring component for such an assembly with fingers which would continue to capture concrete until the bearing resistance increased enough to counteract the increased applied load. Thus, increasing the strength of the assembly and making it more resistant to failure.

An additional object is to provide such an assembly which can be set even when the pilot hole is drilled deeper than the depth at which the anchoring mechanism is to be located. Thus, the effectiveness of the anchoring assembly will not be dependent on maintaining tight hole depth tolerances.

The above objects of the present invention are attained by providing an anchoring assembly with an anchoring component or swedge anchor having a plurality of fingers, a spreading component or spreader having a tapered portion which points toward the anchoring fingers, a bolt or threaded shaft onto which the spreader and swedge anchor are positioned, and structure for interlocking the anchor and spreader together during the setting procedure.

In one embodiment, the swedge anchor is secured to the leading end of the threaded shaft with its fingers pointing back toward the trailing end of the shaft. The spreader follows next with its tapered portion pointing toward the leading end of the shaft and the anchoring fingers. A circumferential groove is formed on the tapered surface of the spreader for interlocking the spreader and anchor together. A setting sleeve is positioned against the trailing end of the spreader and is used to locate the anchoring mechanism within a hole in a receiving material and in the setting operation. During the setting operation, the spreader and anchor are forced together causing the anchoring fingers to spread over the tapered surface of the spreader. The fingers eventually deform or buckle into the groove, effectively interlocking the two components together. While anchoring assemblies according to the present invention can be used with a bare pilot hole, it is preferable to use them with a hole having a conical undercut. When such an undercut is used, the spreader and swedge anchor are positioned so that the fingers spread into the undercut cavity.

The fingers of the swedge anchor must be ductile enough to allow deformation into the spreader groove. This ductility also provides the assembly with an energy absorbing mechanism in addition to that provided by the bolt shaft. A feature of the present invention is a notch formed near the tip of each finger which helps to ensure that the buckling of each finger into the groove consistently occurs at the same location on the fingers. When the present invention is used in a bare pilot hole (i.e., without an undercut), it may be necessary to make at least a portion of the fingers harder (i.e., less ductile) in order to bite into the receiving material during setting of the anchoring mechanism. In this situation, the notch helps to insure that the loss in ductility will not affect proper buckling of the finger into the groove.

The above and other objects and advantages of the present invention will become more apparent from the following detailed description of the invention in which:

BRIEF DESCRIPTION OF THE DRAWINGS

FIG. 1 is an elevated view of an anchoring assembly according to the present invention;

FIG. 2 is an axial cross-sectional view of the anchor assembly of FIG. 1 in the initially installed condition;

FIG. 6 is an axial cross-sectional view of the fully set assembly of FIG. 5.

DETAILED DESCRIPTION OF THE INVENTION

Figure 5:
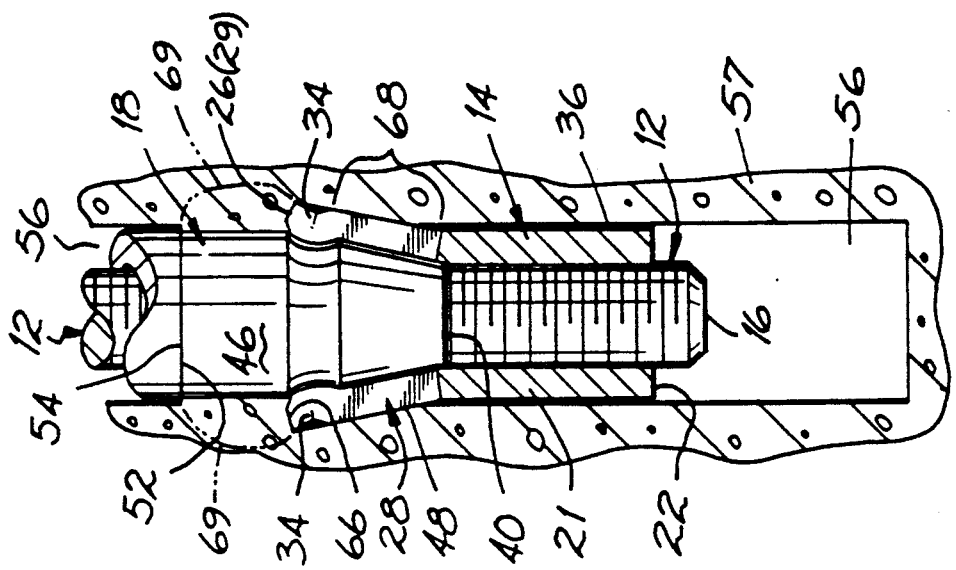
FIG. 5 is a view similar to FIG. 4 with the assembly in the fully set condition.

With reference to FIGS. 1 and 2, there is illustrated an embodiment of an anchoring assembly 10 according to the present invention. The assembly 10 has a threaded shaft or bolt 12, a cylindrical swedge anchor 14 secured to the leading end 16 of the threaded shaft 12, followed by a tapered spreader 18 and a cylindrical setting sleeve 20. A portion 21 of the inside diameter of the swedge anchor 14 is threaded near the anchor's first or leading end 22 for engagement with the leading end 16 of the shaft 12. Four spaced apart longitudinal slots 24 are cut out of the swedge anchor 14 beginning at the second or trailing end 26 of the anchor 14 and extending lengthwise toward the leading end 22 of the anchor 14 and stopping before the threaded portion 21. These slots 24 form four anchoring fingers 28, with the ends 29 of the fingers 28 forming the trailing end 26 of the anchor 14. Each finger 28 has a finger tip 32. An optional circumferential notch 34 is cut into the outer surface 36 of the anchor 14 near its trailing end 26, forming a buckling point for each finger 28. Each tip 32 is bounded by the notch 34. A bevel 38 is formed on the inside edge of the trailing end 26 of the anchor 14 for receiving the first or leading end 40 of the spreader 18.

The spreader 18 is cylindrically shaped, with a conical portion 42 tapering toward the spreader's leading end 40. A circumferential groove 44 is formed on the outer surface of the tapered portion 42 adjacent to a non-tapered cylindrical portion 46. The cylindrical portion 46 of the spreader 18 has about the same outside diameter as the setting sleeve 20 and the swedge anchor 14. The sleeve 20, spreader 18 and the non-threaded portion 48 of anchor 14 all have about the same inside diameter.

The anchoring assembly 10 can be put together by inserting the leading end 16 of the threaded shaft 12 into the trailing end 50 of the setting sleeve 20, extending the shaft 12 out the leading end 52 of the sleeve and into the trailing end 54 of the tapered spreader 18, then extending the shaft 12 out the leading end 40 of the spreader 18 and into the trailing end 26 of the swedge anchor 14, and finally threading the leading end 16 of the shaft 12 into the threaded portion 21 of the anchor 14.

Referring to FIGS. 2–6, the assembly 10 is preferably used in a pilot hole 56 drilled into a receiving material 57 (e.g., concrete), having an inside diameter slightly larger than the outside diameter of the assembly 10 and having a conical undercut 58, with the cone of the undercut 58 tapering down in the direction of the bottom of the hole 56. Other undercut configurations, such as a cylinder (not shown), could also be used with this embodiment. In fact, this embodiment has performed satisfactorily even with a bare pilot hole (i.e., without an undercut).

Figure 3:
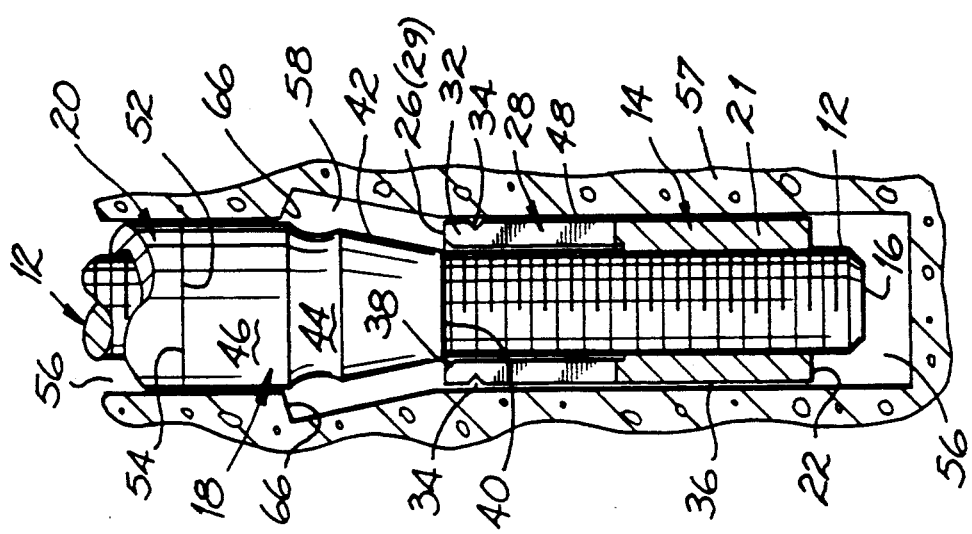
FIG. 3 is an enlarged view of the lower portion of FIG. 2.

The anchor assembly 10 can be installed by first inserting the assembly 10 into the hole 56 to a depth such that the tapered portion 42 of the spreader 18 corresponds with the undercut 58 (see FIGS. 2 and 3). The assembly 10 can be set (i.e., engagement and interlocking of the spreader 18 and anchor 14) by restraining the setting sleeve 20 (see force arrows 60) and applying an axial load 62 on the shaft 12, pulling the shaft 12 out of the hole 56 and forcing the tapered portion 42 of the spreader 18 and the anchor fingers 28 together. During this operation, the threaded shaft 12 is prevented from rotating. These forces 60, 62 can be applied in a number of ways, such as by using a central pull hydraulic ram (not shown), or alternatively, by torquing a threaded nut (not shown) against the sleeve's trailing end 50. As the axial force 62 is applied, the fingers 28 slide up the tapered portion 42, filling the conical undercut cavity 58 (see FIG. 4). Once the fingers 28 make contact with the undercut ledge 66, additional application of the axial force 62 causes the fingers 28 to deform or buckle into the spreader groove 44, effectively interlocking the spreader 18 and anchor 14 (i.e., anchoring mechanism) together.

The spreader 18 must be made from a material that is strong enough to prevent it from collapsing against the threaded shaft 12 during the setting operation. The notch 34 causes each finger 28 to buckle into the groove 44 at the same point along the finger's length. However, if they have sufficient ductility, fingers 28 will still deform into the groove 44 without the optional notch 34. The fingers 28 buckle such that each finger tip 32 fans out and forms an obtuse angle with the balance of the finger 68 (see FIG. 5). The forces generated during the setting process cause a zone 69 of the concrete 57, adjacent to the finger ends 29, to become reoriented. The concrete in this zone 69 is compressed and reorients itself snugly around the cylindrical portion 46 of the spreader 18. Along with the interlocking of the spreader 18 and anchor 14, this reorientation helps to insure that the anchoring mechanism remains snugly embedded within the hole 56. As the axial load 62 is increased, the tips 32 of the fingers 28 continue to fan out (i.e., the obtuse angle decreases) until enough concrete 57 is captured by the finger tips 32 to provide the bearing resistance necessary to counteract the increased axial force 62. Additional reorientation may also occur, with subsequent increases in axial load 62. The ductility of the anchor 14 also provides an energy absorbing mechanism, in addition to that provided by the shaft 12, for preventing catastrophic failures.

Once the anchoring mechanism has been set (i.e., the spreader 18 and anchor 14 are interlocked), the restraining force 60 exerted on the setting sleeve 20 can be released and only the axial force 62 applied. In fact, if it is not needed as a spacer between the shaft 12 and the concrete 57, the sleeve 20 can be removed. If the spreader 18 and anchor 14 do not interlock, the assembly is more likely to fail when only the axial force 62 is applied.

Figure 4:
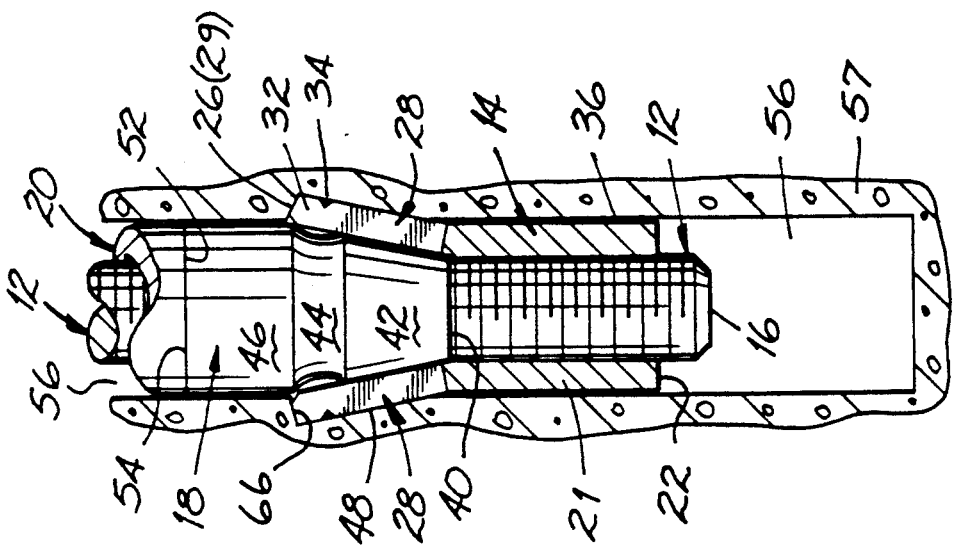
FIG. 4 is a view similar to FIG. 3 with the assembly in a partially set condition.

Assuming the spreader 18 and anchor 14 were engaged to the extent shown in FIG. 4 and there was no groove 44 or any other means for interlocking the two components, the assembly 10 could fail prematurely under an applied load 62. Application of only an axial tensile force 62 on the threaded shaft 12 would cause the ends 29 of the fingers 28 to press against the undercut ledge 66, which in turn would put the fingers 28 under compression, lengthwise. These resulting compressive forces have a buckling effect on the fingers 28 which exerts a resulting force against the tapered surface 64 of the spreader 18 (the same resulting force which would cause buckling into the groove, if there was one). A component of this resulting force is directed axially against the spreader 18. In other words, as the axial load 62 is applied the fingers 28 tend to squeeze against the spreader 18 forcing it back out the hole 56. Therefore, because the sleeve 20 is unrestrained (i.e., free to move along the shaft 12), once the resulting force overcomes the frictional forces between the spreader 18 and fingers 28 and any frictional forces between the spreader 18 and the concrete 57, the spreader 18 will be forced out from between the fingers 28, causing the fingers 28 to buckle and collapse and the assembly 10 to fail. With the present invention, these resulting forces must overcome not only the associated frictional forces but the interlocking mechanism (i.e., groove 44/finger 28 engagement) as well, before the spreader 18 will disengage from the anchor 14.

The ability to withstand such axial loads 62 without restraining the sleeve 20 is a mandatory requirement of the nuclear construction industry, in particular, and a design guideline for the construction industry in general.

Even when a restraining force 60 is applied to the setting sleeve 20, such as when a workpiece 70 is secured to the concrete surface 72 with a nut (not shown) and washer 74, the assembly could still fail if the spreader 18 and anchor 14 were not interlocked. As an axial load 62 is applied, the threaded shaft 12 stretches. This elongation of the shaft 12 gives the sleeve 20 a degree of freedom to move lengthwise within the hole 56. Initially, this freedom of movement is usually limited. However, it affords the spreader 18 a degree of latitude to disengage from the anchor 14 (see previous discussion). Once the spreader 18 and anchor 14 begin to disengage, the anchoring mechanism begins to loosen within the hole 56. With a cyclic or vibrational load, this freedom of movement (i.e., loose condition of the anchoring mechanism) can cause the various assembly components (i.e., the sleeve 20, spreader 18, and anchor 14) to vibrate. Because concrete, like most ceramics, fractures easily under impact, vibration of the anchor 14 can cause the fingers 28 to chip away at the surrounding concrete 57. By continually crumbling the concrete around it, the anchor's freedom of movement increases, which also increases the severity of each impact and can eventually result in failure of the assembly 10 and/or the surrounding concrete receiving material 57.

It is clear from the preceding discussion that one of the key features of this invention is the interlocking of the anchoring and spreading components. Therefore, those skilled in the art will readily comprehend the advantages and benefits of interlocking the spreading and anchoring components of various anchoring assembly embodiments, including configurations where the spreading component is secured to the leading end of the threaded shaft, with the anchoring component following thereafter.

Tensile load tests according to ASTM E488 testing procedures, were performed on a number of anchoring assemblies according to the previously described embodiment of the present invention. Each test sample satisfied the requirements of ACI 349, with the threaded shafts failing before either the anchoring mechanism or the concrete receiving material. The assemblies which were tested used ½" ASTM A193-B7 fully threaded steel bolt shafts. The setting sleeves were made from AISI 1018/1020 plain carbon steel, the tapered spacers were made from AISI 4140 cold rolled steel and the swedge anchors were made from AISI 1018 plain carbon steel. It should be noted that this invention can be modified to accommodate a wide variety of bolt sizes and can be made from a wide variety of materials, depending on the anchoring requirements of the particular application.

From the above disclosure of the general principles of the present invention and the preceding detailed description, those skilled in the art will readily comprehend the various modifications to which the present invention is susceptible. Therefore, I desire to be limited only by the scope of the following claims and equivalents thereof:

What I claim is:

1. An anchoring assembly for use in a hole bored inwardly from the surface of a receiving material, comprising:
    a threading shaft having a leading end and a trailing end;
    a spreader having a first end, a second end, an outer surface and a tapered portion, with said tapered portion tapering toward the first end of said spreader;
    a swedge anchor having a first end, a second end and a plurality of fingers with ends, the ends of said fingers forming the second end of said swedge anchor, said swedge anchor being secured to said threaded shaft such that said fingers point toward the trailing end of said shaft and said spreader being slidable lengthwise along said shaft, with the tapered portion of said spreader being in position to engage the fingers of said swedge anchor; and
    locking means for interlocking said spreader and said swedge anchor together, said locking means including at least one groove on the outer surface of said spreader adapted for receiving at least a portion of said swedge anchor during the setting of said anchoring assembly to thereby interlock said spreader and said swedge anchor,
    wherein said anchoring assembly is set into the hole by forcing said spreader and said swedge anchor together until said spreader and said swedge anchor engage and interlock.

2. The assembly of claim 1, further comprising:
    a setting sleeve having a leading and trailing end and being slidable lengthwise along said shaft, with said sleeve being positioned along said shaft between the trailing end of said shaft and said spreader, wherein during the setting of said anchoring assembly into the hole, said sleeve is held in place and the trailing end of said shaft is moved away from the leading end of said sleeve in order to engage and interlock said spreader and the fingers of said swedge anchor.

3. The assembly of claim 1 wherein said spreader and said swedge anchor interlock when a portion of said swedge anchor fingers buckle into said groove.

4. The assembly of claim 3 wherein said groove is circumferential and located on the outer surface of said tapered portion adjacent to the point where the outer surface of said spreader begins to taper.

5. The assembly of claim 3 wherein each of said fingers has a tip and the buckling of said fingers into said groove causes each of said tips to form an obtuse angle with the balance of its finger.

6. The assembly of claim 3 wherein said locking means further comprises:
    means for causing each of said fingers to buckle into said groove consistently at the same point along the length of said fingers.

7. The assembly of claim 6 wherein each finger has an outer surface and said buckling means comprises:
    at least one notch formed in the outer surface of each of said fingers and separating each of said fingers into a tip and a balance of the finger, wherein the buckling of said fingers into said groove causes each of said tips to form an obtuse angle with the balance of its fingers.

8. The assembly of claim 1 wherein said spreader is made of a material which is strong enough to prevent said spreader from collapsing onto said threaded shaft when said anchoring assembly is set.

9. The assembly or claim 1 wherein at least the fingers of said swedge anchor have enough ductility to act as an energy absorbing mechanism to inhibit catastrophic overload failure of said anchoring assembly.

10. An anchoring assembly for use in a hole bored inwardly from the surface of a receiving material, comprising:

a threaded shaft having a leading end and a trailing end;

a spreader having a first end, a second end, an outer surface and a tapered portion, said spreader being slidable lengthwise along said threaded shaft, with said tapered portion tapering toward the first end of said spreader;

a swedge anchor having a first end, a second end and a plurality of fingers with ends, the ends of said fingers forming the second end of said swedge anchor, the first end of said swedge anchor being threadably secured to said shaft, with said fingers pointing toward the trailing end of said shaft, and said spreader being positioned between the trailing end of said shaft and said swedge anchor, with the first end of said spreader facing the second end of said swedge anchor; and locking means for interlocking said spreader and said swedge anchor together, said locking means including at least one groove located on the outer surface of said spreader and at least a portion of said swedge anchor being deformable into said groove during the setting of said anchoring assembly to thereby interlock said spreader and said swedge anchor, wherein said anchoring assembly is set into the hole by holding said spreader at a desired location along the length of the hole and forcing said fingers of said swedge anchor over said spreader until said spreader and said swedge anchor interlock by said locking means.

11. The assembly of claim 10, further comprising:

a sleeve having a leading and trailing end and being slidable lengthwise along said shaft, with said sleeve being positioned along said shaft between the trailing end of said shaft and the second end of said spreader, wherein said sleeve assists in holding said spreader at a desired location along the length of the hole during the setting of said anchoring assembly.

12. The assembly of claim 10, wherein said swedge anchor is non-permanently secured to said threaded shaft, and after said spreader and said swedge anchor have interlocked, said threaded shaft can be replaced by a different threaded shaft without having to reset said anchoring assembly.

13. The assembly of claim 10 wherein said spreader and said swedge anchor interlock when a portion of said swedge anchor fingers buckle into said groove.

14. The assembly of claim 13 wherein said groove is circumferential and located on the outer surface of said tapered portion adjacent to the point where the outer surface of said spreader begins to taper.

15. The assembly of claim 13 wherein each of said fingers has a tip and the buckling of said fingers into said groove causes each of said tips to form an obtuse angle with the balance of its finger.

16. The assembly of claim 13 wherein said locking means further comprises:

means for causing each of said fingers to buckle into said groove consistently at the same point along the length of said fingers.

17. The assembly of claim 16 wherein each finger has an outer surface and said buckling means comprises:

at least one notch formed in the outer surface of each of said fingers and separating each of said fingers into a tip and a balance of the finger, wherein the buckling of said fingers into said groove causes each of said tips to form an obtuse angle with the balance of its finger.

18. The assembly of claim 10 wherein said spreader is made of a material which is strong enough to prevent said spreader from collapsing onto said threaded shaft when said anchoring assembly is set.

19. The assembly of claim 10 wherein at least the fingers of said swedge anchor have enough ductility to act as an energy absorbing mechanism to inhibit catastrophic overload failure of said anchoring assembly.

20. An anchoring assembly for use in a hole bored inwardly from the surface of a receiving material, comprising:

a threaded shaft having a leading end and a trailing end;

a cylindrical setting sleeve having a leading end and a trailing end and being slidable lengthwise along said threaded shaft;

a spreader having an outer surface, a first end and a second end and a tapered portion, said spreader being slidable lengthwise along said threaded shaft, with said tapered portion tapering conically toward the first end of said spreader, and at least one circumferentially oriented groove located on the outer surface of said tapered portion adjacent to the point where said spreader beings to taper; and a swedge anchor having a first end, a second end and a plurality of fingers with ends, the ends of said fingers forming the second end of said swedge anchor, and each of said fingers having an outer surface with a circumferential notch formed therein, said notch separating each of said fingers into a tip and a balance of the finger, with the first end of said swedge anchor being threadably secured to said shaft and said fingers pointing toward the trailing end of said shaft, the spreader following next in line with the first end of said spreader facing the second end of said swedge anchor, and the sleeve following thereafter between the trailing end of said shaft and the second end of said spreader, wherein said anchoring assembly is set into the hole by holding said spreader at a desired location along the length of the hole with the assistance of said setting sleeve and forcing the fingers of said swedge anchor over said spreader until a portion of said fingers buckles into said groove, causing said spreader and said swedge anchor to interlock.

* * * * *